United States Patent
Giger et al.

[11] 3,838,567
[45] Oct. 1, 1974

[54] UNIDIRECTIONAL COUPLING DEVICE FOR A WATCH MOVEMENT

[75] Inventors: Urs Giger, Solothurn; Friedrich Perrot, Lengnau, both of Switzerland

[73] Assignee: Eta A. G. Ebauches-Fabrik, Grenchen, Switzerland

[22] Filed: Jan. 15, 1974

[21] Appl. No.: 433,467

[30] Foreign Application Priority Data
Feb. 16, 1973  Switzerland.......................... 2237/73

[52] U.S. Cl.................................... 58/82 A, 192/46
[51] Int. Cl........................ G04b 5/02, F16d 11/00
[58] Field of Search.............. 58/82 R, 82 A; 192/46

[56] References Cited
UNITED STATES PATENTS

| | | | |
|---|---|---|---|
| 1,981,297 | 11/1934 | Aegler | 58/82 A |
| 2,400,818 | 5/1946 | Gallagher | 192/46 |
| 2,756,559 | 7/1956 | Derr | 58/82 A |
| 3,623,582 | 11/1971 | Giger et al. | 192/46 |

Primary Examiner—George H. Miller, Jr.
Attorney, Agent, or Firm—Stevens, Davis, Miller & Mosher

[57] ABSTRACT

A unidirectional coupling device for a watch movement comprising two disc parts, one of the parts having two projecting elements on its disc face, the other part having apertures into which one of the two projecting elements engages when the disc fact tilts.

9 Claims, 4 Drawing Figures

PATENTED OCT 1 1974

3,838,567

UNIDIRECTIONAL COUPLING DEVICE FOR A WATCH MOVEMENT

The present invention relates to a unidirectional coupling device for a watch movement. Such devices are known to be used in automatic winding mechanisms uitlizing an oscillating weight for wrist-watch movements. Two of these devices are often combined into a pair constituting a reverser which converts into a unidirectional rotation the rotating movements of the oscillating weight which occur in either one direction or the other, depending upon the movement of the wearer's wrist.

In most of the known unidirectional coupling devices, there are provided between the driving part and the driven part either clicks or runners or elements which, in certain cases, are biased by springs and cooperate with a toothing, retaining studs, pins, or notches in the device. These devices require the machining of several parts which must be adjusted to one another. Their assembly is delicate and complicated. Hence their cost-price is relatively high.

In order to remedy these drawbacks, the attempt has already been made to produce devices composed solely of the two moving parts, one driving and one driven, and thus not including any intermediate part. In general, one of the moving parts effects a purely rotating movement while the other effects a combined movement, e.g., rotatory about the coupling axis and translatory along that axis. A device of this kind is also known in which one of the moving parts rotates about its own axis and effects a movement of translation in its plane, so that its axis does not constantly coincide with that of the other moving part. The operation of these known devices is delicate because it entails movements of translation of one moving part with respect to the other.

It is the object of the present invention to provide a unidirectional coupling device of much simpler construction than the devices known heretofore, and one which operates reliably.

To this end, the present invention relates to a unidirectional coupling device for a watch movement, consisting solely of two coaxial moving parts, one driving and one driven, wherein one of these moving parts is provided with at least two projecting coupling elements and the other with at least three apertures for receiving the coupling elements limited by radial stop elements, and wherein the moving parts are connected to one another axially so that upon a relative rotation of the moving parts with respect to one another in the direction of loose wheel operations, the passing of a coupling element from the aperture in which it is engaged onto the adjacent stop element causes one of the moving parts to tilt about an axis parallel to the plane of the other moving part, whereas upon a relative rotation in the coupling direction, one of the coupling elements, engaged in one of the apertures, comes up against the stop element adjacent to this aperture and causes the other moving part to be driven.

Several embodiments are possible, with an odd or even number of projecting elements. When this number is even, the number of apertures is odd. If there are just two projecting elements, they are directly opposite each other on the moving part which carries them. If there are more than two of these elements, they are regularly distributed about the axis of the device.

The accompanying drawing illustrates an embodiment and a variation of the device according to the invention, by way of example.

Figure 3:
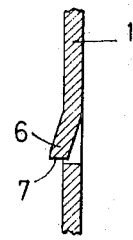
FIG. 3 is a partial sectional view taken along the line III—III of FIG. 1, on a still larger scale.

The device which is about to be described is of greatly simplified construction since it comprises only two parts moving with respect to each other, a driving wheel 1 and a driven part 2. The driving wheel 1 is a simple disc provided with a peripheral toothing 3, a center opening 4, and two diametrically opposite coupling elements 5 and 6 which are produced by the partial blanking and bending at an angle of the tongues in the shape of segments of an annulus, as can be seen in FIG. 3. The angle of the lower surface of the tongues 5 and 6 to the plane of the wheel 1 will be on the order of 15°, for example. The angle of the front face 7 of the tongue to the plane of the wheel is 90° so that it can act as a blocking face, as will be seen later.

The moving part 2 is composed of a shaft 8, produced by profile-turning and having pivots at each of its ends so that it can be mounted between two frame elements and rotate about a fixed axis, and of a wheel 9 having its center opening fitted over a cylindrical bearing surface 13 of the shaft 8. The wheel 9, slightly larger in diameter than the wheel 1, has a peripheral toothing 10, and in an annular zone within the toothed zone 10, a series of seven blanked apertures 11, each in the shape of a segment of an annulus. These apertures are separated from one another by stop elements 12 which extend radially and are equidistant from one another. Each stop element presents an abutment face.

Figure 1:
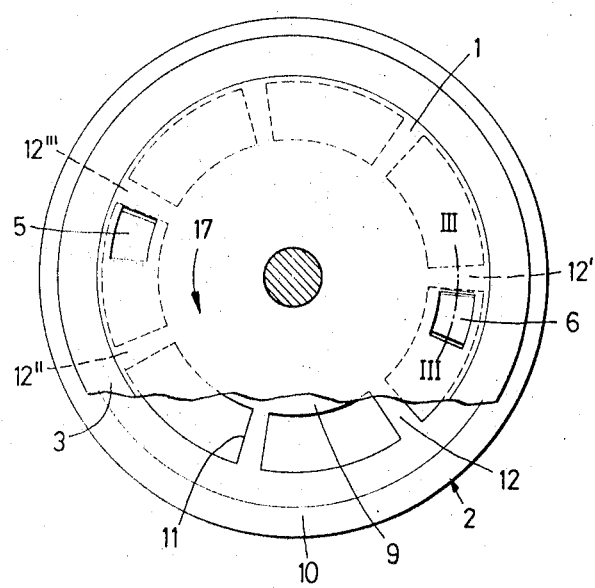
FIG. 1 is a top plan view of the device, with one part being partially broken away.
Figure 2:
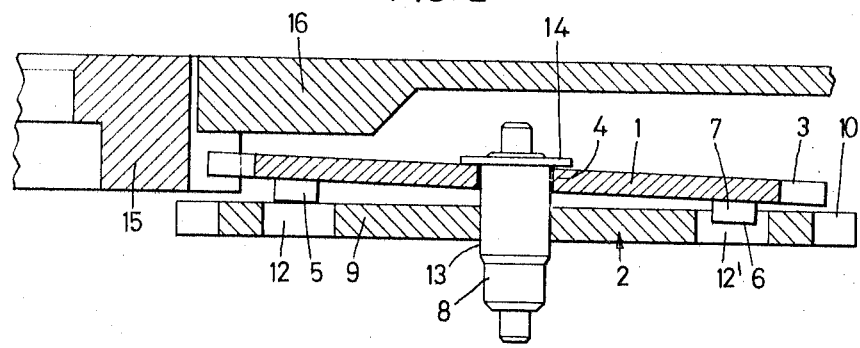
FIG. 2 is an axial sectional view on a larger scale, showing the device in operating position.

The center opening 4 for the shaft 8 is slightly larger in diameter than that of the bearing surface 13 on which it is engaged, which guides the wheel 1 to assume a slanting position as can be seen in FIG. 2. Moreover, the wheel 1 is axially guided with respect to the moving part 2 by a collar 14 of the shaft, on the one hand, and by the upper surface of the wheel 9, on the other hand. The distance between these two limiting elements will be determined so as to ensure the proper functioning of the device, as will be explained later. First, however, it should be made clear that in the embodiment shown in FIG. 2, the toothing of the driving part 1 is engaged with the toothing of a pinion 15 of a winding weight 16. This weight pivots in the center of a watch movement (not shown) so as to be able to turn in either direction according to the movements of the wearer's wrist. Assuming that, at a certain moment, the unidirectional coupling device is in the position shown in FIGS. 1 and 2 and that, at that moment, the oscillating weight 16 is turning in a direction where the driving part is being moved by the pinion 15 in the direction indicated by the arrow 17, it will be seen that the device will be in loose wheel operation. As a matter of fact, the lower incline of the projecting tongue 6 which is opposite the point where the wheel 1 meshes with the pinion 15 is going to enter into contact with the stop element 12', while the projecting tongue 5 is going to move towards the stop element 12''. The wheel 1 is uncoupled from the moving part 2. It rotates about the axis of shaft 8, coaxially thereto. On the other hand, as the tongue 6 ascends the element 12', it will cause the wheel 1 to tilt about an axis perpendicular to the plane of FIG. 2, and this will force the opposite tongue 5 to enter the aperture 11 limited by side faces of stop elements such as 12'''. When the end of the tongue 5 opposite the face 7 arrives at the edge of the element 12'', the lower incline of the tongue 5 is going to ascend the stop element 12'', so that the wheel 1 will tilt again and end up in the position shown in FIG. 2. This combined rotating and tilting movement will necessarily continue as long as the device turns in the direction indicated by the arrow 17, i.e., in loose wheel operation. The position shown in FIG. 2 will recur every time the projecting tongue 5 is in a relative position such that its blocking face 7 has just passed beyond one of the stop elements such as 12'''. As the device can have any spatial orientation when the watch is being worn, and as the friction and the inertia of the parts offset the effects of the gravitational forces, the relative position shown in FIGS. 1 and 2 can very well occur in practice.

If, starting from that position, we imagine a brusque reversal of the direction of rotation of the weight 16, the wheel 1 is caused to move in the direction opposite to that indicated by the arrow 17. Taking the most unfavorable case, the tongue 5 will pass over the transverse element 12'''. In that event, it is the stop face 7 of the tongue 6 which will come up against an abutment face of the stop element 12 and ensure that the moving part 2 is driven in the clockwise direction seen in FIG. 1. Because of the torque which is transmitted by the coupling, the wheels 1 and 2 will be maintained in their relative position shown in FIG. 2, which means that after half a turn, they will have assumed the relative positions occupied by wheels 18 and 19 in FIG. 4. The result is that the toothing of the wheel 1 is constantly moving in that of the pinion 15, axially upwards or downwards. It has been found, however, that this movement does no harm. It follows from what has just been described that the distance between the upper surface of the wheel 9 and the collar 14 must be sufficient to allow each of the tongues 5 and 6 to leave the apertures 11 separately. However, this distance should not be too great. It should remain less than the thickness of the wheel 1 plus the added height of the tongues 5 and 6, so that even if the two wheels are parallel and if the wheel 1 is lying against the collar 14, the tongues 5 and 6 are still engaged in the apertures 11. It should be noted, moreover, that the two wheels 1 and 9 cannot be parallel to one another except in certain specific orientations with respect to the wheel 9.

Figure 4:
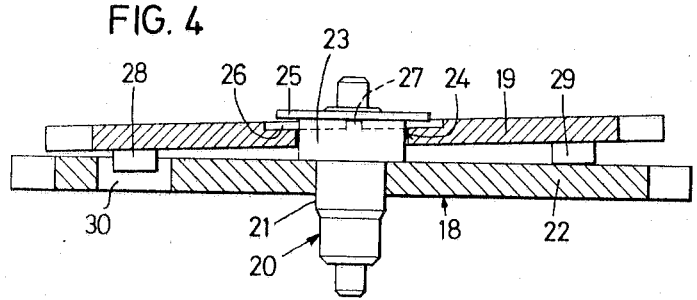
FIG. 4 is an axial sectional view of the variation.

In the variation shown in FIG. 4, the moving part 18 comprises a shaft 20 having a first cylindrical bearing surface 21 about which a wheel 22 is fitted and a second cylindrical bearing surface 23 for the pivoting, with play, of an opening 24 of the wheel 19. This bearing surface 23 is limited by a collar 25 which corresponds to the collar 14. However, about this collar, the wheel 19 has an annular recess 26 divided in half by a diametrical rib 27 which is perpendicular to the line determined by the centers of two tongues 28 and 29. This rib 27, resting against the collar 25, facilitates the tilting of the wheel 19 when the slanting tongues 28 and 29 alternately pass over the several radial stop elements 30 which separate the apertures of the wheel 22.

Owing to the rib 27, the axis of tilt of the moving part 19 is made to intersect the axis of the wheel 18. Irregularities produced during manufacture thus have less influence on the operation of the device.

Otherwise, the operation of this variation is similar to that of the embodiment described in FIGS. 1 and 2.

In other embodiments, the coupling elements 5, 6, 28, 29 could be produced by stamping instead of by partial blanking and bending. One or both wheels could be made of an injection-molded synthetic material. The number of apertures 11 could be greater or less than that shown. If less, the amount of travel lost during a reversal of the direction of rotation of the weight 16 would be greater than with the device illustrated here.

In any event, it is indispensable that each radial stop element such as 12, 12', 30, etc., always be directly opposite an aperture and that the length of the apertures be at least equal to that of the coupling tongues.

In still other embodiments, the inclines which cause the tilting of the wheel mounted with play could be formed in the radial sides of the apertures instead of on the projecting tongues. However, the solution shown in the drawing is the simplest one from the point of view of manufacture.

The main advantage of the device described is its simplicity of manufacture and assembly. This advantage is clearly brought out by the preceding description. Another advantage is the robustness of the device, the parts of which are relatively substantial and therefore quite resistant to wear. Finally, this device is reliable in operation as has been demonstrated by the tests carried out up to now.

What we claim is:

1. A unidirectional coupling device able to operate in a loose wheel state or in a coupled state, for a watch movement, comprising a first moving part having a fixed axis of rotation, a second moving part, guiding means for said second moving part, arranged for permitting said second moving part to rotate coaxially with and to assume slanting positions with respect to said first moving part, at least two coupling elements projecting from one of said moving parts towards the other, each of said coupling elements having a stop face and three stop elements provided on the other one of said moving parts, said stop elements extending radially between apertures or recesses in the other one of said moving parts, and said apertures or recesses being arranged for receiving said coupling elements, abutment faces on each one of said stop elements, for cooperating with said stop faces, and inclines on said coupling elements or on said stop elements for providing alternate tilting movements of said second moving part during operation of said device in the loose wheel state.

2. A device according to claim 1, wherein the coupling elements are formed by portions of a moving part, blanked and bent at an angle.

3. A device according to claim 1, wherein the coupling elements are formed by portions stamped in a moving part.

4. A device according to claim 1, wherein the coupling elements or the apertures have inclines so oriented as to cause the tilting during loose wheel operation.

5. A device according to claim 4, wherein the coupling elements and the apertures are limited on the side opposite the inclines by radial sides at least approximately perpendicular to the planes of the moving parts.

6. A device according to claim 1, wherein each moving part comprises a circular plate, one of these plates being integral with a shaft while the other pivots with play on said shaft.

7. A device according to claim 6, wherein the number of coupling elements is two, these coupling elements being directly opposite one another, while the number of apertures for receiving the coupling elements is an odd number.

8. A device according to claim 6, wherein said shaft has a cylindrical bearing surface for the pivoting of the tilting part which is limited on one side by the plate of the moving part integral with this shaft and on the other side by a projecting collar made in one piece with the shaft.

9. A device according to claim 8, wherein the plate of the moving part which pivots on the shaft with play has a rectilinear rib perpendicular to the axis determined by the centers of the two projecting coupling elements and situated on the collar side.

* * * * *